United States Patent
Brown et al.

(10) Patent No.: US 9,875,146 B1
(45) Date of Patent: Jan. 23, 2018

(54) MANAGING WORKLOADS IN A DATABASE SYSTEM USING A PLURALITY OF HEALTH AND DEMAND METRICS

(71) Applicant: Teradata US, Inc, Dayton, OH (US)

(72) Inventors: Douglas P. Brown, Rancho Santa Fe, CA (US); Thomas Patrick Julien, San Marcos, CA (US)

(73) Assignee: Teradata US, Inc., Dayton, OH (US)

( * ) Notice: Subject to any disclaimer, the term of this patent is extended or adjusted under 35 U.S.C. 154(b) by 89 days.

(21) Appl. No.: 14/971,376

(22) Filed: Dec. 16, 2015

Related U.S. Application Data

(60) Provisional application No. 62/097,309, filed on Dec. 29, 2014.

(51) Int. Cl.
  G06F 9/46 (2006.01)
  G06F 9/50 (2006.01)
  G06F 17/30 (2006.01)

(52) U.S. Cl.
  CPC ...... *G06F 9/5083* (2013.01); *G06F 17/30348* (2013.01); *G06F 17/30424* (2013.01)

(58) Field of Classification Search
  None
  See application file for complete search history.

(56) References Cited

U.S. PATENT DOCUMENTS

2010/0153958 A1* 6/2010 Richards ............... G06F 9/5083
                                                                    718/104

* cited by examiner

*Primary Examiner* — Bing Zhao
(74) *Attorney, Agent, or Firm* — Howard Speight, PLLC

(57) ABSTRACT

A database system monitors a metric for a Workload Definition (WD) and adjusts a metric throttle for the WD to a new metric throttle level $C_n$, computed as the average of a theoretical metric level $C_c$ that would drive a metric to a target T and a theoretical metric level $C_r$ that would drive a rolling average of the metric to the target T.

14 Claims, 3 Drawing Sheets

MANAGING WORKLOADS IN A DATABASE SYSTEM USING A PLURALITY OF HEALTH AND DEMAND METRICS

CROSS-REFERENCE TO RELATED APPLICATIONS

This application claims the benefit of U.S. Provisional Application No. 62/097,309, filed Dec. 29, 2014, which is incorporated by reference herein in its entirety and for all purposes.

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Generally, one important aspect of computing and computing systems is storage of data. Today, there is an ever increasing need to manage storage of data in computing environments. Databases are good examples of computing environments or systems where the storage of data can be crucial. As such, databases are discussed below in greater detail as an example.

The term database can also refer to a collection of data and/or data structures typically stored in a digital form. Data can be stored in a database for various reasons and to serve various entities or "users." Generally, data stored in the database can be used by one or more of the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations, larger user communities, or device populations. Larger databases can be supported by relatively larger capacities, including computing capacity (e.g., processor and memory) to allow them to perform many tasks and/or complex tasks effectively at the same time (or in parallel). On the other hand, smaller database systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or 1/0 processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

Generally, data (or "Statistics") can be collected and maintained for a database. "Statistics" can be useful for various purposes and for various operational aspects of a database. In particular, "Statistics" regarding a database can be very useful in optimization of the queries of the database, as generally known in the art.

More recently, in-memory processing systems, including in-memory database systems have been developed where data is typically stored and processed in memory which can offer much faster processing times than systems that also store data for processing in non-volatile or persistent storages (e.g., Hard Disk Drives (HDD's, Solid Disk Drives (SOD), Flash memory).

Database systems and environments are useful.

SUMMARY

In one aspect, a method includes a database system monitoring a metric for a Workload Definition (WD) and adjusting a metric throttle for the WD to a new metric throttle level $C_n$, computed as the average of a theoretical metric level $C_c$ that would drive a metric to a target T and a theoretical metric level $C_r$ that would drive a rolling average of the metric to the target T.

Implementations may include one or more of the following. The metric throttle may include a throttle on concurrency, defined to be the number of concurrent requests allowed to run at a time for the WD. The following definitions may be made:

$$C_c = (T*A)/Cur,$$

$$C_r = (T*A_r)/Cur_r,$$

$$C_n = \text{AVG}(C_c, C_r),$$

T=target value,
A=current timeshare concurrency level (for "active" concurrent queries),
Cur=current metric value,
$A_r$=rolling average timeshare concurrency, and
$Cur_r$=rolling average metric value.

The method may include determining a plurality of metric throttle levels $C_2, C_3 \ldots C_m$ each computed as the average of a respective theoretical metric level $C_{2c}, C_{3c} \ldots C_{mc}$ that would drive the metric to a target T and a theoretical metric level $C_{2r}, C_{3r} \ldots C_{mr}$ that would drive a rolling average of the metric to the target T and adjusting the new metric throttle level $C_n$ to the minimum of $C_n, C_2, C_3 \ldots C_m$. The metric throttle levels $C_2, C_3 \ldots C_m$ may be for a set of metrics selected from the group consisting of concurrency, AWTs, CPU, I/O, and Memory Service Time delays. The following definition may be made: $C_n = \min(C_n, C_2, C_3 \ldots C_m)$. The method may include adjusting $C_n$ according to a maximum limit heuristic. The method may include determining if a query in a queue can be released based on $C_n$, and, if so, releasing the query from the queue. The method may include periodically performing the adjusting element.

In one aspect, a computer program is stored in a non-transitory computer-readable tangible medium, on which is recorded a computer program. The computer program includes executable instructions, that, when executed, perform a method including monitoring a metric for a Workload Definition (WD) and adjusting a metric throttle for the WD to a new metric throttle level $C_n$, computed as the average of a theoretical metric level $C_c$ that would drive the metric to a target T and a theoretical metric level $C_r$ that would drive a rolling average of the metric to the target T.

DETAILED DESCRIPTION

Figure 1:
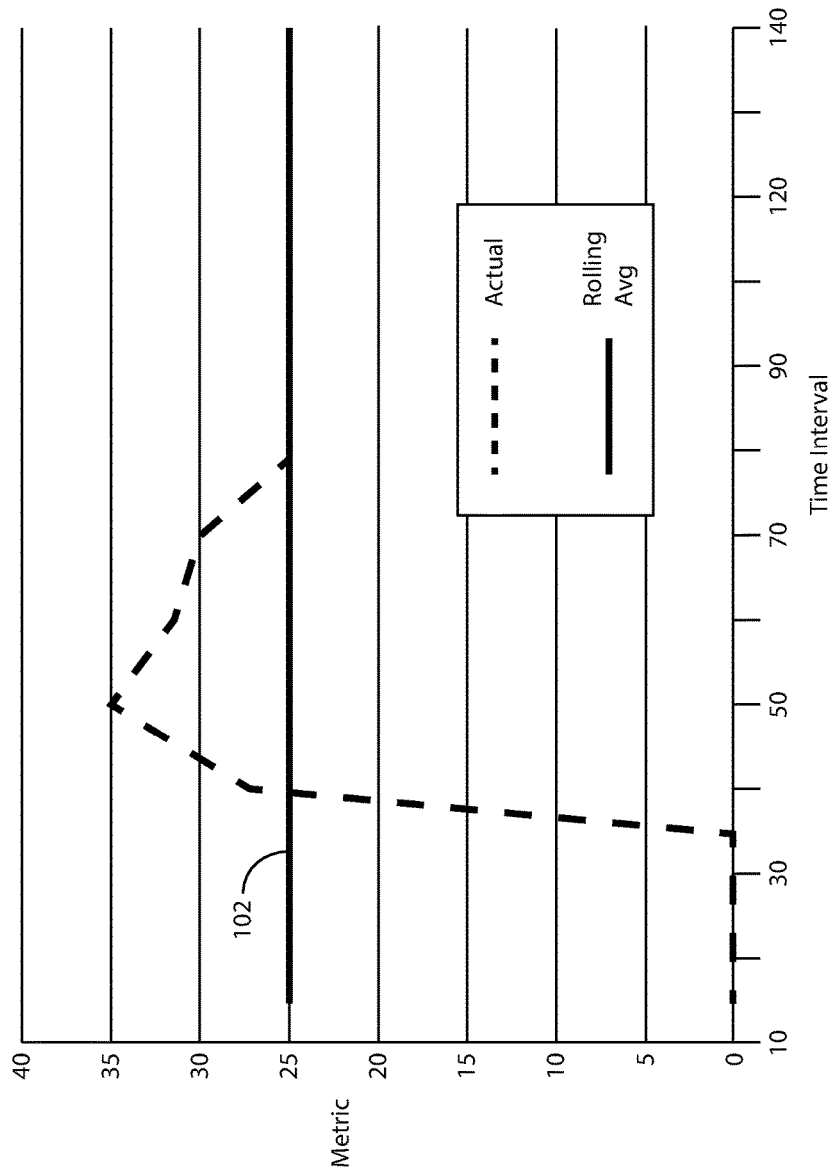
FIG. 1 shows the effect of managing with a rolling average.

As noted in the background section, database systems and environments are useful.

Currently, database management systems can monitor and effectively control processing of database queries. For example, Teradata Work Management (TDWM) "Traffic Cop" can let a user choose an event type for a Workload Definition (WD) defined in a RuleSet. This is commonly referred to as a: "By-WD" event. Today, these events can be used primarily for monitoring and reporting purposes, to gauge the success of the workload's performance, and to note trends with respect to meeting SLGs.

A second use of the By-WD events is to automatically detect when Arrival and Concurrency levels are too high or conversely too low. For example, one of the primary approaches used by DBAs and System Administrators is to first identify that there is a problem with their system. Investigations into why will typically start with analysis at the system-level (System CPU). If the system is not 100% busy and does not have heavy skewing, then typically the DBA can next check for:

a) if Arrival Rate >Throughput System Level Goals (SLG), then a possible cause of the missed SLG is System Over-load. Not only is the system falling behind and unable to keep up with arrivals to this workload, other competing workloads may be impacting the ability to at least deliver the throughput SLG;

b) if Arrival Rate <=Throughput SLG, then the cause of the missed SLG is under-demand. In other words, there is insufficient demand from the application servers to meet the throughput SLG. The system could be nearly idle and still miss the throughput SLG, so by pre-qualifying the missed SLG throughput event with arrivals >throughput SLG, you avoid detecting an uninteresting situation.

However, if the CPU is 100% busy, then the number of active sessions will be checked for unusually high levels of concurrency. Concurrency can be defined based on the concurrent requests or queries (e.g., two (2) concurrent SQL queries running at the same time).

Generally, these investigations are typically triggered based on the By-WD event enabling the DBA to act manually or automatically to resolve the situation, and bring WD performance back to SLG conformance. To automate correction for these type problems currently requires what is called a "state change". A state change is a relatively expensive operation. Performing a state change in the middle of a system undergoing workload management performance issues can have latency issues to take affect due to the expense of the state change operation. It should be noted that customers cannot define 'states' for all scenarios without creating a large and complex State Matrix, i.e., a predefined set of TASM rules for varied conditions. Some customers go to the trouble to dynamically create rulesets that adjust the throttle when a performance crisis occurs. There is a need for dynamic methods to adjust throttles without a 'State Change'. In other words, "Dynamic throttles" are needed.

In one aspect, a method for implementing Dynamic Throttles is provided. The methods can, for example, be provided as a light-weight method for implementing Dynamic throttles that can solve problems associated conventional techniques with relatively less overhead. In doing so, a new type of dynamic throttle (concurrency) event can defined that can assist the customers manage complex workload management by environments, automatically changing the value of a throttle as an event. A new type of event (throttle event) that can automatically act within the framework of the TDWM regulator but does not require a State change.

It should be noted that the technique can also be applied to unusually high numbers of AMP Worker Task (AWT) activity. If some workloads have too many active sessions, then appropriate actions can be taken, for example, to limit concurrency (with a throttle), to abort queries, and/or to make adjustments to the Priority Scheduler weights. If the CPU is 100% busy and active sessions looks ok, the DBA might next check the CPU usage by WD and/or Session to see if there is a runaway query. From here the DBA can take the appropriate action, usually to abort the offending request or move it to a Penalty-box with a CPU limit or cap.

Often the business' ultimate management goal is to manage a workload's concurrency on an hourly or daily basis, without concern for momentary low or high-usage. As such, the customers desire the opportunity to make up for low-usage moments by over-consuming for a time. Those low-usage moments can be due to either low Timeshare issues, or under-demand. Therefore, a new option is created for Timeshare only WDs.

By-WD events allow the DBA to manage based on a Rolling Averaging 102 whose duration is of the DBA's choosing, as shown in FIG. 1. TDWM would manage the rolling average 102 and derive the resultant "Dynamic throttle" value for the moment via control theory and other Statistical processing techniques (SPC). It would then communicate a revised concurrency value to TDWM for its management at appropriate intervals.

Figure 3:
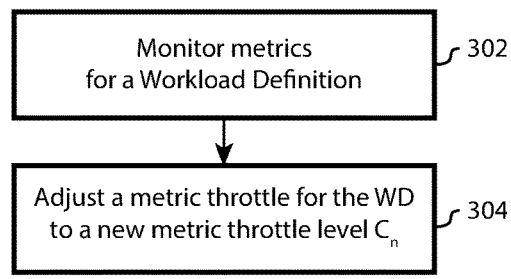
FIG. 3 is a flow chart.

TDWM can, for example, monitor key health and demand metrics (By-WD events) (block 302) to determine what the timeshare WD throttle limit should be at any given point in time (block 304), as shown in FIG. 3. The limit can change dynamically and constantly, just as the system demand and health characteristics also change constantly due to normal mixed workload variations. By monitoring these metrics and then adjusting the throttle limit based on those metrics, the key health and demand resources can be indirectly monitored to stay within healthy levels, thereby maintaining the system in a healthier state.

Figure 4:
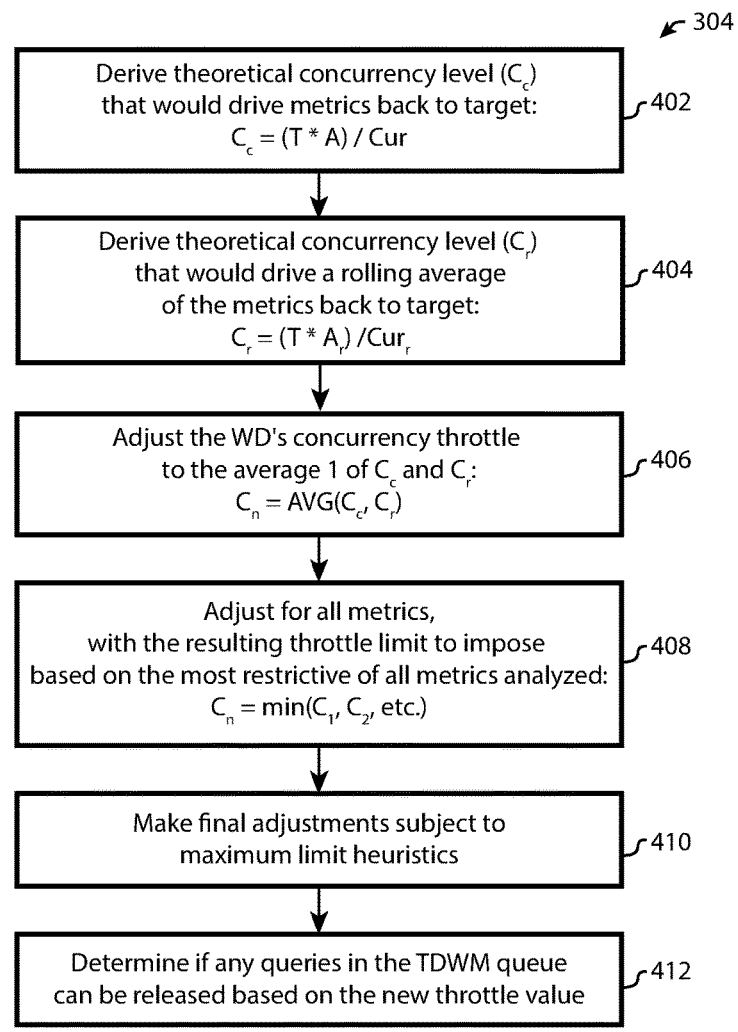
FIG. 4 is a flow chart.

The monitoring of key metrics and subsequent throttle limit adjustment can rely on control theory and Statistical processing techniques to reduce oscillation in the regulation ("cruise-control"). The control theory technique used to accomplish this is to base adjustments on both the current actual metric values as well as the historical metric values. A technique for dynamic automatic throttles can include the following:

Target Value (T) for each monitored metric. (Concurrency, AWTs, CPU, I/O, Memory, Service Time delays, etc.)
Data obtained from monitoring the By-WD events is done internally within the TDWM regulator:
Current metric value (Cur)
Current Timeshare Automatic Throttle Limit ($C_c$)
Current Timeshare Concurrency Level (A) (for "active" concurrent queries
RollingAvg Timeshare Concurrency ($A_r$)
RollingAvg metric value ($Cur_r$)
Perform the following analysis and concurrency throttle adjustment at every Traffic Cop event interval, as shown in FIG. 4.
(For example, every 60, 600, 3600 seconds, etc.)
Derive theoretical concurrency level ($C_c$) that would drive metrics back to target (block 402):

$$C_c = (T*A)/Cur$$

Derive theoretical concurrency level ($C_r$) that would drive Rolling Average of the Concurrency back to target (block 402):

$$C_r = (T*A_r)/Cur_r$$

Adjust the WD's concurrency throttle to the average 1 of $C_c$ and $C_r$ (block 406):

$$C_n = AVG(C_c, C_r)$$

Adjust for all metrics, with the resulting throttle limit to impose based on the most restrictive of all metrics analyzed (block 408):

$$C_n = \min(C_1, C_2, \text{etc.})$$

Final adjustments: subject to maximum limit heuristics—For example, Timeshare limit cannot exceed X % of total AWT pool (block 410).
Determine if any queries in the TDWM queue can be released based on the new throttle value (block 412). If so dynamically change the throttle value and release the queries from the TDWM queue.

Min keeps the metric below the threshold. Average would allow over-consumption to compensate for under-consumption, which is useful for concurrency management.

Figure 2:
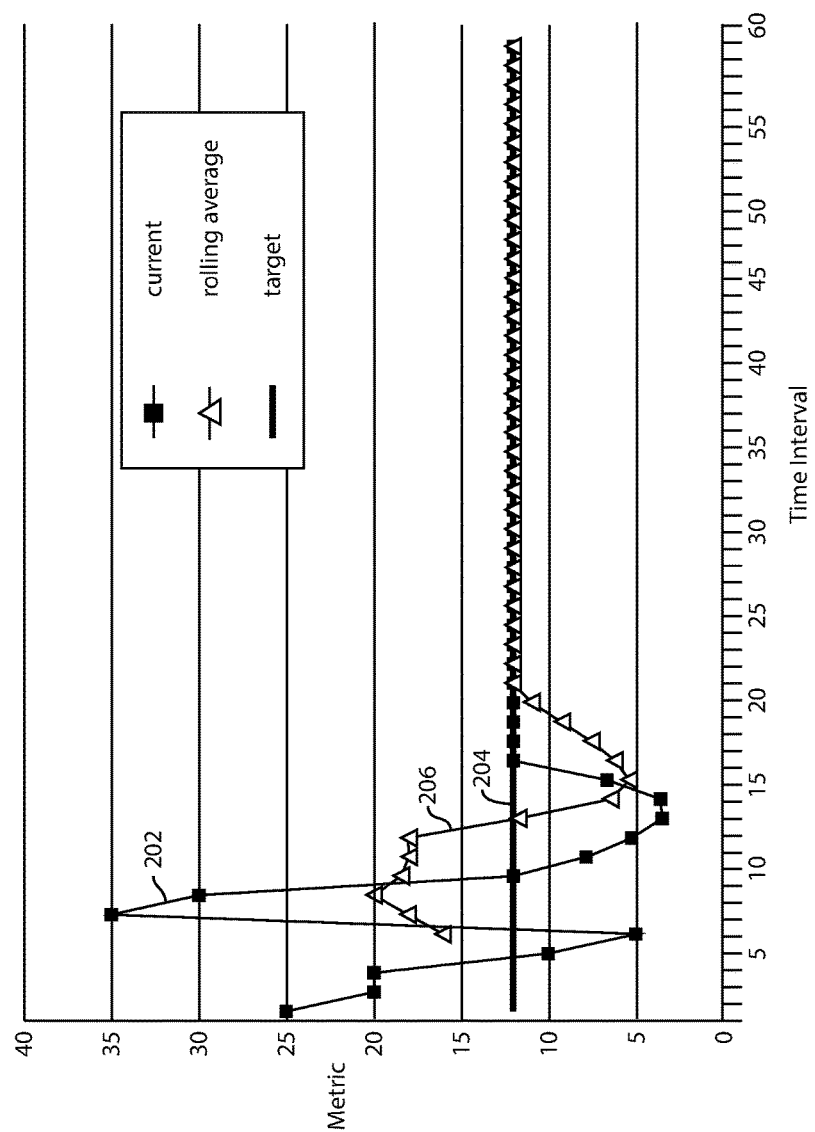
FIG. 2 shows a comparison between a current metric and a rolling average of the metric.

FIG. 2 shows an environment that was allowed to run with no concurrency throttle values established for a small period of time. Here you can see the wild swings in the current metric (concurrency) levels 202. In this example a Target (T) concurrency value 204 was established by using a Rolling average of 3600 seconds. In this particular case you can see a Target (T) throttle value of 12 was derived. The current concurrency 202 and rolling average metrics 206 is measured as a By-WD event with a timer set at 60 seconds. The task of the dynamic concurrency throttle algorithm is to bring the environment's concurrency health metrics back to target. FIG. 2 shows the result of the algorithm described above in bringing the concurrency back in line with the target. It is important to note that our goal is to bring the current metrics back to conformity and then keep it there. FIG. 2 demonstrates this algorithm's ability to do this effectively. Note that because actual active concurrency is part of the formula, it doesn't necessarily adjust limit up when there is no demand.

This approach can simplify the implementation of dynamic throttles as well as removing the dependency of a State change at the cost of user complexity.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-com bi nation.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of managing workloads in a database system having a plurality of health and demand metrics $M_1 \ldots M_m$, the method comprising:
  specifying a target value $T_1 \ldots T_m$ for each respective health and demand metric $M_1 \ldots M_m$;
  determining a theoretical metric level $C_{1c}, C_{2c} \ldots C_{mc}$ for each respective health and demand metric $M_1 \ldots M_m$ that would drive a value of the respective health and demand metric $M_1 \ldots M_m$ to the respective target value $T_1 \ldots T_m$ by computing $C_{nc}$ to be greater than $Cur_n$ if $Cur_n < (T_n$ adjusted by A), to be equal to $Cur_n$ if $Cur_n = (T_n$ adjusted by A), and to be less than $Cur_n$ if $Cur_n > (T_n$ adjusted by A), where A is a current timeshare concurrency level, and $Cur_n$ is a current value of the metric $M_n$;
  determining a rolling-average theoretical metric level $C_{1r}, C_{2r} \ldots C_{mr}$ for each respective health and demand metric $M_1 \ldots M_m$ that would drive the value of the respective health and demand metric $M_1 \ldots M_m$ to the respective target value $T_1 \ldots T_m$ by computing $C_{nr}$ to be greater than $Cur_{nr}$ if $Cur_{nr} < (T_n$ adjusted by $A_r$), to be equal to $Cur_{nr}$ if $Cur_{nr} = (T_n$ adjusted by $A_r$), and to be less than $Cur_{nr}$ if $Cur_{nr} > (T_n$ adjusted by $A_r$), where $A_r$ is a rolling average timeshare concurrency level, and $Cur_{nr}$ is a rolling average value of the metric $M_n$;
  averaging the theoretical metric level $C_{1c}, C_{2c} \ldots C_{mc}$ and the rolling-average theoretical metric level $C_{1r}, C_{2r} \ldots C_{mr}$ for each respective health and demand metric $M_1 \ldots M_m$ by computing average theoretical metric levels $C_n = AVG(C_{nc}, C_{nr})$ for $n = 1 \ldots m$;
  selecting the most restrictive of the average theoretical metric levels $C_1, C_2, C_3 \ldots C_m$ as a proposed throttle limit on the database system;
  determining that a query in a queue to be processed by the database system would be released from the queue upon application of the proposed throttle limit; and, as a result,
  applying the proposed throttle limit and releasing the query from the queue.

2. The method of claim 1 wherein one of the health and demand metrics is concurrency, defined to be the number of concurrent requests allowed to run at a time for the WD.

3. The method of claim 1 wherein:
  computing $C_{nc}$ comprises computing $C_{nc} = (T_n * A)/Cur_n$, for $n = 1 \ldots m$,
  computing $C_{nr}$ comprises computing $C_{nr} = (T_n * A_r)/Cur_{nr}$, for $n = 1 \ldots m$.

4. The method of claim 1 wherein:
  selecting the most restrictive of $C_1, C_2, C_3 \ldots C_m$ as the proposed throttle limit on the database system comprises selecting the minimum of $C_1, C_2, C_3 \ldots C_m$.

5. The method of claim 4 wherein the metric throttle levels $C_1, C_2, C_3 \ldots C_m$ are for a set of metrics selected from the group consisting of concurrency, Access Module Processor (AMP) Worker Tasks (AWTs), CPU, I/O, and Memory Service Time delays.

6. The method of claim 1 further comprising:
  adjusting $C_n$ according to a maximum limit heuristic.

7. The method of claim 1 further comprising periodically performing the determining the theoretical metric levels element, the determining the rolling-average theoretical metric levels element, the averaging the theoretical metric levels element, the selecting element, the determining that a query should be released element, and the applying element.

8. A computer program, stored in a non-transitory computer-readable tangible medium, on which is recorded a computer program, the computer program comprising executable instructions, that, when executed, perform a method of managing workloads in a database system having a plurality of health and demand metrics $M_1 \ldots M_m$, the method comprising:
  specifying a target value $T_1 \ldots T_m$ for each respective health and demand metric $M_1 \ldots M_m$;
  determining a theoretical metric level $C_{1c}, C_{2c} \ldots C_{mc}$ for each respective health and demand metric $M_1 \ldots M_m$ that would drive a value of the respective health and demand metric $M_1 \ldots M_m$ to the respective target value $T_1 \ldots T_m$ by computing $C_{nc}$ to be greater than $Cur_n$ if $Cur_n < (T_n$ adjusted by A), to be equal to $Cur_n$ if $Cur_n = (T_n$ adjusted by A), and to be less than $Cur_n$ if $Cur_n > (T_n$ adjusted by A), where A is a current timeshare concurrency level, and $Cur_n$ is a current value of the metric $M_n$;
  determining a rolling-average theoretical metric level $C_{1r}, C_{2r} \ldots C_{mr}$ for each respective health and demand metric $M_1 \ldots M_m$ that would drive the value of the respective health and demand metric $M_1 \ldots M_m$ to the respective target value $T_1 \ldots T_m$ by computing $C_{nr}$ to be greater than $Cur_{nr}$ if $Cur_{nr} < (T_n$ adjusted by $A_r$), to be equal to $Cur_{nr}$ if $Cur_{nr} = (T_n$ adjusted by $A_r$), and to be less than $Cur_{nr}$ if $Cur_{nr} > (T_n$ adjusted by $A_r$), where $A_r$ is a rolling average timeshare concurrency level, and $Cur_{nr}$ is a rolling average value of the metric $M_n$;
  averaging the theoretical metric level $C_{1c}, C_{2c} \ldots C_{mc}$ and the rolling-average theoretical metric level $C_{1r}, C_{2r} \ldots C_{mr}$ for each respective health and demand metric $M_1 \ldots M_m$ by computing average theoretical metric levels $C_n = AVG(C_{nc}, C_{nr})$ for $n = 1 \ldots m$;
  selecting the most restrictive of the average theoretical metric levels $C_1, C_2, C_3 \ldots C_m$ as a proposed throttle limit on the database system;
  determining that a query in a queue to be processed by the database system would be released from the queue upon application of the proposed throttle limit; and, as a result,
  applying the proposed throttle limit and releasing the query from the queue.

9. The computer program of claim 8 wherein one of the health and demand metrics is concurrency, defined to be the number of concurrent requests allowed to run at a time for the WD.

10. The computer program of claim 8 wherein:
  computing $C_{nc}$ comprises computing $C_{nc} = (T_n * A)/Cur_n$, for $n = 1 \ldots m$,
  computing $C_{nr}$ comprises computing $C_{nr} = (T_n * A_r)/Cur_{nr}$, for $n = 1 \ldots m$.

11. The computer program of claim 8 wherein:
  applying the most restrictive of $C_1, C_2, C_3 \ldots C_m$ as a throttle limit on the database system comprises applying the minimum of $C_1, C_2, C_3 \ldots C_m$.

12. The computer program of claim 11 wherein the metric throttle levels $C_1, C_2, C_3 \ldots C_m$ are for a set of metrics selected from the group consisting of concurrency, Access Module Processor (AMP) Worker Tasks (AWTs), CPU, I/O, and Memory Service Time delays.

13. The computer program of claim 8 wherein the method further comprises:
  adjusting $C_n$ according to a maximum limit heuristic.

14. The computer program of claim 8 wherein the method further comprises periodically performing the determining the theoretical metric levels element, the determining the rolling-average theoretical metric levels element, the averaging the theoretical metric levels element, the selecting element, the determining that a query should be released element, and the applying element.

\* \* \* \* \*